(12) United States Patent
Wisnudel et al.

(10) Patent No.: US 7,998,546 B2
(45) Date of Patent: Aug. 16, 2011

(54) WIRELESSLY POWERED FLEXIBLE TAG

(75) Inventors: Marc Brian Wisnudel, Clifton Park, NY (US); Ben Purushotam Patel, Niskayuna, NY (US); Richard Louis Frey, Delanson, NY (US); Radislav Alexandrovich Potyrailo, Niskayuna, NY (US); Kyle Erik Litz, Ballston Spa, NY (US); Peng Jiang, Gainesville, FL (US); Andrea Peters, Clifton Park, NY (US)

(73) Assignee: NBCUniversal Media LLC, New York, NY (US)

( * ) Notice: Subject to any disclaimer, the term of this patent is extended or adjusted under 35 U.S.C. 154(b) by 1183 days.

(21) Appl. No.: 11/538,451

(22) Filed: Oct. 4, 2006

(65) Prior Publication Data
US 2007/0114621 A1    May 24, 2007

Related U.S. Application Data

(63) Continuation-in-part of application No. 11/536,199, filed on Sep. 28, 2006, which is a continuation-in-part of application No. 11/286,413, filed on Nov. 21, 2005, now Pat. No. 7,653,919.

(51) Int. Cl.
*B32B 9/00* (2006.01)
*B32B 7/12* (2006.01)
*B42D 15/00* (2006.01)

(52) U.S. Cl. ....... 428/40.1; 428/343; 428/914; 428/915; 428/916; 283/72; 283/83

(58) Field of Classification Search ............... 428/40.1, 428/40.2, 41.6, 41.9, 42.1, 343, 354, 914–916; 283/72, 81, 100, 101, 107
See application file for complete search history.

(56) References Cited

U.S. PATENT DOCUMENTS

| | | | | |
|---|---|---|---|---|
| 3,757,087 A | * | 9/1973 | Bernard | 219/549 |
| 4,640,727 A | * | 2/1987 | Janssen | 156/240 |
| 5,695,860 A | * | 12/1997 | Imaichi et al. | 428/209 |
| 6,019,865 A | * | 2/2000 | Palmer et al. | 156/265 |
| 2002/0163479 A1 | | 11/2002 | Lin et al. | |

FOREIGN PATENT DOCUMENTS
WO   WO 98/40930   9/1998

OTHER PUBLICATIONS

Dr. Patrick Collins; "Equatorial Times No. 3"; The Newsletter of the SPS 2000 Community Around the World, Dec. 1996. Available at http://www.spacefuture.com/power/equatorialtirnes/3.shtml.

* cited by examiner

*Primary Examiner* — Patricia L Nordmeyer
(74) *Attorney, Agent, or Firm* — Fletcher Yoder

(57) ABSTRACT

A wirelessly powered flexible tag configured to be in contact with a substrate is provided. The tag includes a coupling layer configured to couple the tag to the substrate. An electrical circuit disposed on the coupling layer and configured to interact wirelessly with an external stimulus. The tag further includes at least one electrode or at least one heating element in operative association with the electrical circuit, and configured to generate electrical energy or thermal energy, respectively. Upon wireless interaction with the external stimulus the tag is configured to induce an electrical response, a thermal response, or a combination of both in the substrate.

28 Claims, 5 Drawing Sheets

WIRELESSLY POWERED FLEXIBLE TAG

The present patent application is a continuation-in-part application from U.S. patent application Ser. No. 11/536,199 filed Sep. 28, 2006, which is itself a continuation-in-part application from U.S. patent application Ser. No. 11/286,413, filed Nov. 21, 2005, now U.S. Pat. No. 7,653,919, the disclosures of which are hereby incorporated by reference in their entireties.

BACKGROUND

The invention relates generally to a wirelessly powered flexible tag (WPFT). Upon interaction with an external stimulus, the WPFT is configured to induce an electrical response, a thermal response, or a combination of both in a substrate.

Although reflective power technology, such as radio frequency identification (RFID) technology, has become commonplace in modern-day society, current devices serve only a very limited purpose. For example, today the most common RFID tags are "passive" devices, that is, devices configured to receive a very small amount of energy, and transmit a response signal to a readout device. These types of passive RFID tags are analogous to barcodes. Even more advanced "active" RFID tags (e.g. RFID tags that possess their own internal power source) still only function as sensor/readout devices. Although active RFID tags have been used as sensors (e.g. temperature sensors, humidity sensors, shock/vibration sensors, light sensors, and radiation sensors) none of the energy induced or generated by the RFID tag is used to do any work or enable any change or response in the substrate to which the active RFID tag is affixed.

SUMMARY

Figure 1:
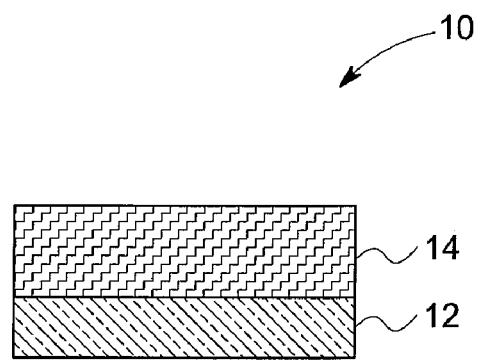
FIG. 1 is a cross-sectional view of a wirelessly powered flexible tag having a coupling layer and electrical circuitry in accordance with an exemplary embodiment of the invention.

One exemplary embodiment of the invention is a wirelessly powered flexible tag configured to be in contact with a substrate. The tag includes a coupling layer configured to couple the tag to the substrate. An electrical circuit disposed on the coupling layer and configured to interact wirelessly with an external stimulus. The tag further includes at least one electrode or at least one heating element in operative association with the electrical circuit, and configured to generate electrical energy or thermal energy, respectively. Upon wireless interaction with an external stimulus the tag is configured to induce an electrical response, a thermal response, or a combination of both in the substrate.

Another exemplary embodiment of the invention is a wirelessly powered flexible tag configured to be in contact with a substrate. The tag includes a patterned coupling layer configured to couple the tag to the substrate. The tag further includes radio frequency circuitry disposed on the coupling layer and configured to interact wirelessly with an external stimulus, at least one electrode or at least one heating element in operative association with the electrical circuit, and configured to generate electrical energy or thermal energy, respectively. Further, the tag includes a backing layer coupled to the radio frequency circuitry or to the patterned coupling layer. Upon wireless interaction with the external stimulus the tag is configured to induce an electrical response, a thermal response, or a combination of both in the substrate.

Another exemplary embodiment of the invention is a method for using a wirelessly powered flexible tag. The method includes coupling the wirelessly powered flexible tag to the substrate. The method further includes interacting the tag with an external stimulus to induce an electrical response, a thermal response, or a combination of both in said substrate.

Advantages and features of the present invention will be more readily understood from the following detailed description of preferred embodiments of the invention that is provided in connection with the accompanying drawings.

DETAILED DESCRIPTION OF THE EMBODIMENTS

Embodiments of the present invention are directed to a wirelessly powered flexible tag (WPFT). Various embodiments of the WPFT described herein allow the wireless transfer of energy from an external stimulus to a substrate through the WPFT, because the WPFT is configured to act as a "wireless" device. As used herein, the terms "wireless", "wirelessly", "wireless powered", "wirelessly powered" or "wireless activation" all refer to a mechanism of energy transfer in which electromagnetic energy is transported through space (e.g. without the use of any connecting wires or other physical connections) from a remote external stimulus to the WPFT. Non-limiting examples of suitable external stimuli include laser radiation, infrared radiation, thermal energy, X-rays, gamma rays, microwaves, visible light, ultraviolet light, ultrasound waves, sound waves, radio frequency (RF) waves, electrical energy, chemical energy, magnetic energy, mechanical energy, or combinations thereof. Furthermore, inter-conversion between any of the above listed external stimuli (e.g. conversion of radio frequency waves to electrical energy and/or thermal energy) is also contemplated within the scope of this invention. The interaction of the external stimulus with the WPFT may include continuous, discontinuous, or pulsed forms of the external stimulus. In one embodiment, the external stimulus is radio frequency waves generated from an RF power supply, and wirelessly supplied to the WPFT. The RF power supply may contain a programmable interface that controls the WPFT and optionally receives information back from the WPFT.

Upon interaction with an external stimulus, the WPFT is configured to induce an electrical response, a thermal response, or a combination of both in a substrate. Various embodiments of the WPFT may find utility in applications where a wireless connection to either a heating element or an electrical circuit is preferred. It is envisioned that the WPFT could be used in a variety of technologies including, but not limited to, security and anti-theft applications, biotechnology applications, healthcare applications, sensor applications including biosensors, chemical sensors, photochromic sensors, electrochromic sensors, and thermochromic sensors, analytical instrumentation including portable instrumentation, DNA/RNA amplification, fermentation, or in situations requiring sterile or radioactive environments. The WPFT could be used in a device having flexible heater pads for medical applications similar to the way hot packs are used. The device may include radio frequency circuitry which is wirelessly powered and in turn powers the heating elements and/or electrodes. The heat generated from the heating elements and/or electrodes is spread using heat spreaders to achieve a uniform temperature across the contact surface. Additionally, the system having such a device may include a temperature sensing means to control the temperature of the heater pads.

As used herein, the term "flexible" is synonymous with the term bendable, and the flexible aspect of a WPFT is analogous to the flexible aspect of other known flexible electronic devices such as flexible organic light emitting diodes, flexible liquid crystal displays, flexible circuit boards, and flexible solar cells. The flexible quality of the WPFT stems from the use of bendable materials within the WPFT, such as plastic or other polymeric materials, or thin metal foil.

Suitable substrates for use in conjunction with a WPFT include substrates with a surface configured to receive a thermal and/or electrical response from the WPFT. Non-limiting examples of suitable substrates include plastic substrates, metal substrates, glass substrates, wood substrates, paper substrates, coated substrates, mineral substrates, ceramic substrates or any combinations thereof. In one preferred embodiment the substrate is a plastic polycarbonate substrate. As used herein, the term "polycarbonate" refers to both aliphatic and aromatic polycarbonates, and any co-polymers of polycarbonates incorporating structural units derived from one or more dihydroxy compounds. For example, aromatic polycarbonates marketed under the trade names LEXAN® or MAKROLON® are suitable polycarbonates. In some embodiments the substrate may be treated prior to affixing the WPFT to promote coupling. For example, the surface of the substrate may be subjected to mechanical or chemical roughening to enhance the coupling between the WPFT and the substrate.

In various embodiments the WPFT includes a coupling layer. The coupling layer may either be a single layer or may be a combination of a plurality of sub-layers, which may be collectively termed as the coupling layer. The thickness of the coupling layer may be uniform or may vary from one point to another. For example, the coupling layer may have a variable thickness when the coupling layer is patterned to form one or more recess to dispose electrical circuits therein. In one embodiment the thickness of the coupling layer may be in a range from about 1 micron to about 100,000 microns. In a preferred embodiment the thickness of the coupling layer is from about 1 micron to about 1000 microns.

The coupling layer may be coupled to the substrate by employing variety of coupling mechanisms to promote attraction forces between the WPFT and the substrate. The coupling mechanisms may include an adhesive mechanism, an electrostatic mechanism, a chemical mechanism, an electrochemical mechanism, a thermal mechanism, a physical mechanism, a cross linking mechanism, or any combination thereof. Non-limiting examples of suitable coupling mechanisms include static cling, gravity, bracing, sandwiching, mechanical fixing, clamping, chemical adhesion, or any other physical means of adhesion that affix the WPFT to the substrate. In some embodiments the coupling mechanism may enable reuse of the WPFT. In other words, the WPFT may be coupled and decoupled from the substrate more than once, as desired, and therefore it is envisioned that the WPFT could be a disposable device. Embodiments relating to the reuse of the WPFT with the same or different substrates are described in more detail below with regard to the adhesive components of the coupling layer. Alternatively, the WPFT may be configured to function as an irremovable device once affixed to a substrate. The attraction forces produced by the above mentioned coupling mechanisms may or may not be uniform at the interface between the coupling layer and the substrate. For example, the attraction forces may be weaker at the edges of the WPFT to facilitate removal (e.g. peeling off) of the WPFT once the predetermined and desired electrical and/or thermal response has been induced in the substrate.

As stated above, the coupling layer may include a plurality of individual sub-layers, which form a stack generally referred to as the coupling layer. In one embodiment at least one sub-layer of the coupling layer comprises an adhesive component. Non-limiting examples of suitable adhesive components include pressure sensitive adhesives, epoxy based adhesives, thermoset adhesives, acrylate based adhesives, silicone-based adhesives, elastomer based adhesives or any combination thereof. As use herein term "pressure-sensitive adhesive" includes all polymeric adhesive materials with a glass transition temperature ($T_g$) below about 50° C. In embodiments comprising an adhesive component, the coupling layer includes a first coupling surface with a first tack strength, and a second coupling surface with a second tack strength. As used herein, the term "tack strength" refers to "stickiness" of the coupling layer, and is a measurement of the strength of adhesion, typically measured in units of pounds-force per inch. The first surface of the coupling layer is typically coupled to a substrate to define a first region. The second surface of the coupling layer may be coupled to other components of the WPFT, such as an electrical circuit layer or an optional backing layer, to define a second region. In at least one embodiment, both the first and second surfaces of the coupling layer are coupled to a substrate.

In embodiments where the coupling layer comprises an adhesive component, one aspect of the coupling layer is the ability of the WPFT to be decoupled from a substrate such that the WPFT undergoes a "clean adhesive failure" at the first region between the coupling layer and the substrate. As used herein, the term "clean adhesive failure" is defined as the removal of the WPFT from the substrate such that no significant residue of the coupling layer is left behind on the substrate. As used herein, and with respect to the term "clean adhesive failure", the term "significant" refers to a quantity that affects or interferes with the usability of the substrate. For example, as will be described in detail below, in the case where the substrate is an optical article, such as a DVD, "clean adhesive failure" of the WPFT from the surface of the of the DVD means that the quantity of residue of the coupling layer which might be left behind on the surface of the DVD, including residue which is not visible to the naked eye or touch, is sufficiently small in quantity as to not interfere with the readability of the DVD in a standard DVD reader.

The WPFT further comprises electrical circuitry, including at least one electrode and/or at least one heating element. As used herein, the electrical circuitry includes, but is not limited to, a thermocouple, a light-emitting diode, a strain gauge, a sound producing element, an acoustic sensor, an antenna, a transistor, a diode, a rectifier, a logic chip, a radio frequency identification chip, a capacitor, an integrated circuit, an electrical receiver, a photocell, a rectifier, a resistor, a surface mount resistor, a chip resistor, an electrode, a surface mount light emitting diode (LED) or any combination or multiple thereof. In one embodiment, the WPFT may also contain an integrated circuit with a programmable unique identification number as is used in RFID tags. Various components of the electrical circuitry may be patterned onto the WPFT by a variety of microelectronic techniques including, but not limited to, lithography, sputtering, screen printing, ink-jet printing, or any other routine patterning method which is known to one skilled in the art of microelectronics. Alternatively, various components of the electrical circuitry may be added to the WPFT by physical means, such as "pick-and-place" or other robotic techniques commonly used in the microelectronics industry. In an exemplary embodiment, the electrical circuitry comprises a radio frequency circuitry, including a radio frequency antenna coupled to various additional circuitry components. The radio frequency circuitry is in electrical communication with at least one electrode and/or at least one heating element contained within the WPFT. The electrical circuitry may be disposed on a sub-layer of the coupling, or in embodiments where the WPFT employs an optional backing layer, the electrical circuitry may be coupled to the backing layer.

In those embodiments comprising an electrode, the electrical response the WPFT delivers to the substrate may be a DC electrical response, an AC electrical response, a DC pulsed electrical response, or an AC pulsed electrical response. It should be noted that direct contact between the electrode and the substrate is required to induce the desired electrical response in the substrate. Materials suitable for the electrode include graphitic materials, metals, alloys, conjugated polymers, and generally any material with electron conductivity greater than about 0.001 Siemens/cm, although materials with electron conductivity greater than about 1000 Siemens/cm are preferred. Non-limiting examples of suitable electrode materials include carbon, silver, copper, gold, aluminum, platinum, lead dioxide, stainless steel, indium tin oxide (ITO), and any combinations or alloys thereof.

In such embodiments where the WPFT comprises at least one heating element, the heating element may be fabricated from a material with sufficiently high surface ohmic resistivity. High surface ohmic resistivity can be achieved either by controlling the dimensionality of the heating element (e.g. making the heating element very thin), or as a result of the intrinsic electrical resistivity of the material. For example, materials with a surface ohmic resistivity greater than about 5 ohms/square are suitable, and materials with an ohmic resistivity greater than about 15 ohms/square are especially preferred. Non-limiting examples of suitable heating element materials include titanium, copper, nickel, gold, tantalum-nitride, aluminum, molybdenum, titanium-tungsten, chrome, platinum, nichrome, indium tin oxide (ITO) and any combinations thereof. Embodiments where the heating element is encased in a ceramic or glass housing (e.g. chip resistors) are also contemplated within the scope of this invention. It should be noted that in embodiments comprising a heating element, direct contact between the heating element and the substrate is not strictly required for the WPFT to induce the desired thermal response in the substrate; however, it is preferred.

In some embodiments the WPFT includes an optional backing layer. The backing layer may be used to provide mechanical strength to the WPFT, or alternatively the backing layer may be included in order to hide or protect from direct exposure the electrical components in the WPFT. The backing layer should be made from a flexible material and may include a plurality of individual sub-layers, which form a stack generally referred to as the backing layer. Suitable examples of a flexible backing layer include, but are not limited to, a plastic backing layer, an elastomeric backing layer, a thin metal foil backing layer and any combinations thereof. Non-limiting examples of a suitable plastic backing material include materials comprising polycarbonates, polyethylenes, polypropylenes, polyesters, polyimides, polysulfones, polyethylene terapthalates, polyamides, polyacrylates, polyurethanes, polyesters, or copolymer or combinations thereof. Non-limiting examples of a suitable elastomeric backing material include materials comprising synthetic rubbers including styrene-butadiene random and block copolymers (e.g. KRATON® rubbers), natural rubbers including isoprene, silicone materials including cross linked silicone materials, ethylene propylene diene monomer rubber materials (EPDM), and any copolymers or combinations thereof. For use in high temperature applications, the backing layer should comprise a polymer with a glass transition temperature ($T_g$) greater than about 200° C. such as a polyimide polymer (e.g., ULTEM® from General Electric Company or KAPTON® from Dupont) or a polysulfone polymer (e.g., UDEL® or RADEL® from Solvay). For lower temperature applications, for instance biological applications, the backing layer may comprise a plastic with a $T_g$ lower than about 200° C. or an elastomeric material such as a silicone-based polymer (e.g. poly-dimethyl-siloxane, PDMS). The thickness of the backing layer is variable, and can be from about 10 microns to about 1,000,000 microns in thickness. In a preferred embodiment, the thickness of the backing layer is from about 10 microns to about 1000 microns.

The WPFT may be in operative association with one or more devices, such that the devices may receive energy from the external stimulus in one form and transfer it to the WPFT. The energy is then transferred from the WPFT to the substrate to which the WPFT is coupled to change the state of functionality of the substrate. For example, the WPFT may react with an external stimulus, such as radio frequency waves, and through operative association with the radio frequency circuitry within the WPFT, convert the radio frequency waves into electrical energy and/or thermal energy. The converted electrical energy may then be transferred to the substrate to change the functionality of the substrate from the pre-activated state to the activated state. In the case where the energy from the external stimulus is converted to an electrical response within the WPFT, current in the range from about 1 microampere to about 1 ampere and voltages in the range from about 1 millivolt to about 100 volts are possible at specific regions between the WPFT and the substrate. In the case where the energy from the external stimulus is converted to a thermal energy within the WPFT, a temperature increase in the range of about 10° C. to about 200° C. is possible at specific regions of the interface between the WPFT and the substrate.

Additionally, the WPFT may contain a feedback loop. The feedback loop may be configured to communicate with the source of the external stimulus that is at a remote location and provide inputs to regulate the exposure of WPFT to the external stimulus. For example, the feedback loop may be configured to maintain the temperature of the substrate within a predetermined temperature range by controlling the input of external stimulus to the WPFT. Accordingly, when the temperature of the substrate exceeds the predetermined temperature range, the feedback loop communicates with the source of the external stimulus to reduce the amount of external stimulus interacting with the WPFT, thereby controlling the temperature of the substrate. In another example, the feedback loop may be employed to maintain the records for the usage of the devices. When employed to authorize an article, the WPFT may be used to maintain records and/or to maintain inventory.

In some embodiments, the WPFT comprises an integrated logic chip within its electrical circuitry, which is in wireless communication with an external authorization device that controls the output response of the WPFT through a feedback loop. The function of the integrated logic chip is to act as an internal "on/off" switch within the WPFT, such that the WPFT becomes operationally active (i.e., generates an electrical and/or thermal response in the substrate to which it is affixed) only once it has been authorized to do so by an external authorization device. This feature of the WPFT is useful in applications where there is a desire to control the function of the WPFT, such as anti-theft applications.

In some embodiments, the WPFT may be used as part of an advanced anti-theft system when used in combination with a pre-activated article, such as an optical storage article, designed to inhibit the theft or un-authorized use the article. For example, if the optical storage article is enabled with certain activation features that require either an electrical or a thermal stimulus to enable the content from a "pre-activated" state to an "activated" state, then a removable WPFT may be used in combination with the pre-activated article to wirelessly enable the article, through its packaging, for authorized use only when the disk is purchased or otherwise legitimately obtained at an authorized location. The WPFT may be used in combination with anti-theft features as disclosed in U.S. patent application Ser. No. 11/286,279, which is incorporated herein in its entirety by reference. As used herein, the "pre-activated" state of functionality refers to a state of functionality of the optical article where the anti-theft feature, including the WPFT, has not yet been exposed to one or more external stimulus. In the pre-activated state, the optical article is not readable, that is, in the pre-activated state at least one portion the data on the optical data layer may not be read. The "activated state" of functionality of the optical article refers to the state where the optical article has been exposed to one or more external stimulus through the WPFT. In the activated state of functionality, the data in the optical data layer is readable, without any noise or disturbances/errors, which may otherwise have been present in the pre-activated state. In an exemplary embodiment, the optical article may be an optical storage media (e.g., a compact disc (CD), a digital versatile disc (DVD), multi-layer structures such as DVD-5 or DVD-9, multi-sided structures such as DVD-10 or DVD-18, a high definition digital versatile disc (HD-DVD), a Blu-ray disc, a near field optical storage disc, a holographic storage medium, or other like optical storage medium).

In one embodiment, energy may be delivered to the WPFT by inductive coupling of low frequency radio waves with a wavelength much longer than the largest dimension of the WPFT. It should be appreciated that RF signals with long wavelengths are preferred for such applications, because they are easier to shield than signals with shorter wavelengths. In one embodiment, the transmission means may be identified as an air-core radio frequency transformer. For such transformers to efficiently transfer RF power, they must be matched to the impedance of the external source and load impedance. In one embodiment, the source of external stimulus is the external RF power generator and the load is the heating element(s) and/or electrode(s) to be operated on the WPFT. Impedances of 50 ohms are typical for the source, but impedances may range from a few ohms up to a few hundred ohms for the load(s). As will be appreciated, any impedance matching technique well known in the art can be used to match the transformer, but circuits that require only capacitors and the native inductance of the transformer coils are strongly preferred for their small size.

In one embodiment the energy transferred to the WPFT by inductive coupling is radio frequency alternating current whose frequency may range from hundreds of kHz to hundreds of MHz. This RF AC may be used directly for some embodiments of the WPFT, specifically those embodiments comprising at least one heating element. For such RF loads, the signal should be transmitted between the transformer secondary coil on the WPFT and the load by a RF transmission line to minimize radiation and to maintain the proper load impedance. If the load requires DC rather than AC, then a rectifier and possibly other electronic circuitry described above would be necessary to convert the energy into the required form.

Referring now to FIG. 1, a wirelessly powered flexible tag 10 includes a coupling layer 12 configured to couple the wirelessly powered flexible tag 10 to a surface of a substrate (not shown). Furthermore, the wirelessly powered flexible tag 10 includes a layer 14 having electrical circuitry, such as radio frequency circuitry, and one or more heating elements. The radio frequency circuitry is configured to receive an external stimulus, such as radio frequency radiation. The heating element may be distributed across the area of the layer 14. The electrical circuitry is in operative association with the heating element. The thermal energy generated by the heating element in response to the input electrical stimulus from the electrical circuitry 14 may be transferred to the substrate by conduction. Alternatively, the electrical circuitry and the heating element of the layer 14 may be disposed in separate layers. The surface of the coupling layer 12, which is to be coupled with the substrate may be mechanically textured or chemically treated for enhancing the coupling between the WPFT 10 and the substrate.

Figure 2:
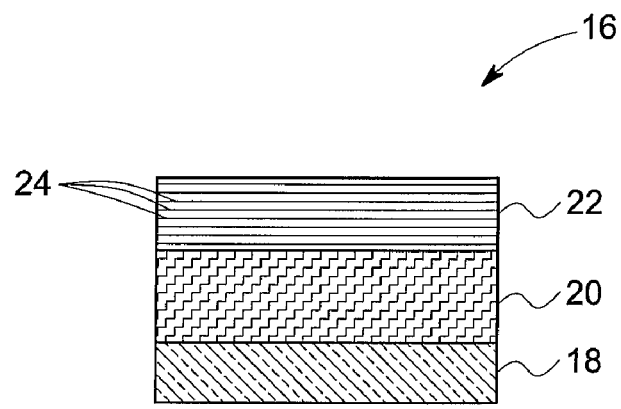
FIG. 2 is a cross-sectional view of a wirelessly powered flexible tag employing a backing layer in accordance with an exemplary embodiment of the invention.

Referring now to FIG. 2, a wirelessly powered flexible tag 16 employing a coupling layer 18, a layer 20 having electrical circuitry and one or more heating element, and a backing layer 22 is illustrated. In the illustrated embodiment, the backing layer 22 includes a plurality of sub-layers as illustrated by the reference numeral 24. In other embodiments, the backing layer 22 may be a single layer and may not be a combination of a plurality of sub-layers 24. The electrical circuitry and the heating elements in the layer 20 are coupled to the sub-layers 24 of the backing layer 22. In an alternate embodiment, the electrical circuitry and the heating element are illustrated as two separate layers. In some embodiments, the electrical circuitry, such as radio frequency circuitry, and/or the heating element, such as microheaters, may be disposed within the sub-layers 24 of the backing layer 22. In these embodiments, the radio frequency circuitry and/or the heating elements are coupled to the sub-layers 24 on either side.

Figure 3:
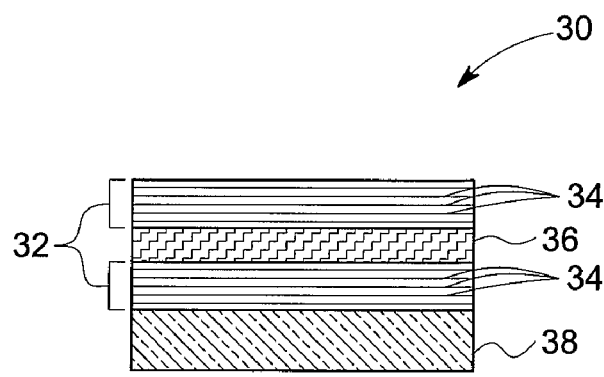
FIG. 3 is a cross-sectional view of a wirelessly powered flexible tag employing a radio frequency circuitry disposed within sub-layers of a backing layer in accordance with an exemplary embodiment of the invention.

FIG. 3 illustrates a wirelessly powered flexible tag 30 having a backing layer 32 that includes a plurality of sub-layers 34. The backing layer 32 is divided in two parts each having a plurality of sub-layers 34. The two parts 34 may or may not be of equal thickness. The radio frequency circuitry and the heating element are illustrated by a single layer 36, which is sandwiched between the sub-layers 34 of the backing layer 32. The wirelessly powered flexible tag 30 further includes a coupling layer 38. It should be noted that the radio frequency circuitry and the heating element may be laid in two separate layers, both of which may be disposed within the sub-layers 34 of the backing layer 32.

Figure 4:
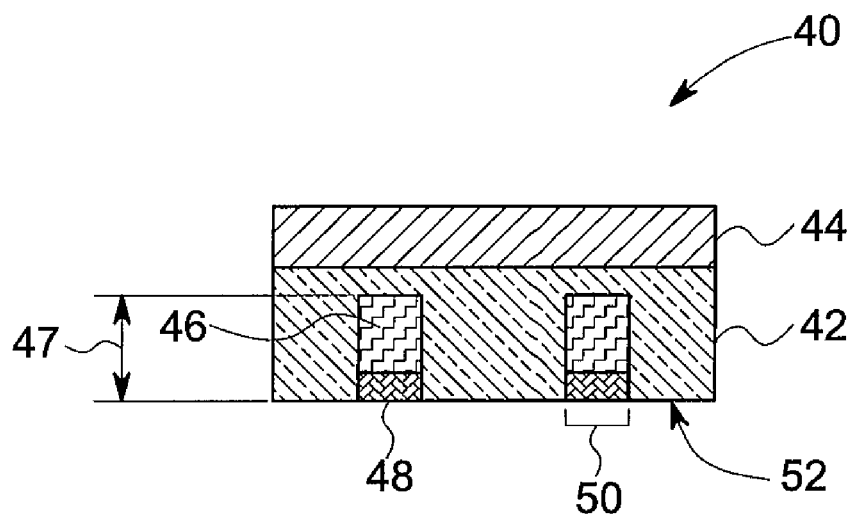
FIG. 4 is a cross-sectional view of a wirelessly powered flexible tag having a patterned coupling layer employing radio frequency circuitry and electrodes in accordance with an exemplary embodiment of the invention.

Turning now to FIG. 4, the wirelessly powered flexible tag 40 employs a patterned coupling layer 42. The patterned coupling layer 42 is coupled to a backing layer 44. Although not illustrated, the backing layer 44 may include a plurality of sub-layers. The pattern in the coupling layer 42 is formed such that the radio frequency circuitry 46 and the heating elements and/or electrodes 48 are disposed in the recess 50 of the coupling layer 42. The recess 50 extends to a height 47 in the coupling layer 42 such that the radio frequency circuitry 46 is not in contact with the backing layer 44. The recesses 50 are formed such that sides of the electrodes and/or heating elements 48 facing away from the backing layer 44 are substantially coplanar with the surface 52 of the patterned coupling layer 42. The surface 52 is configured to be in contact with a substrate when the wirelessly powered flexible tag 40 is disposed on the substrate. As used herein, the term "substantially coplanar" refers to the degree of co-planarity which enables the patterned coupling layer 42 to be adhered to the substrate, while a direct physical contact between the electrodes and/or heating elements 48 and the substrate remains. It should be noted that a direct physical contact with the substrate is required while employing electrodes to form a complete electrical circuit, whereas while employing heating elements, the thermal energy produced by the heating elements may be transferred to the substrate by a conduction mechanism, hence, direct physical contact is not necessary as described with respect to FIG. 5.

Figure 5:
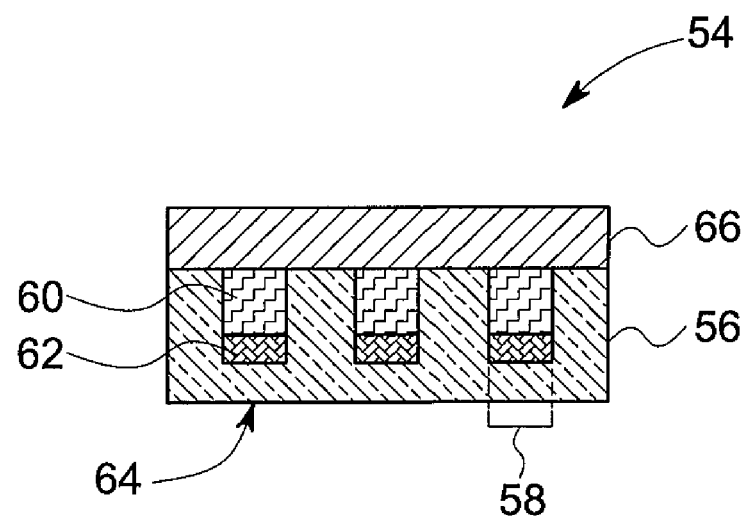
FIG. 5 is a cross-sectional view of a wirelessly powered flexible tag having a patterned coupling layer employing radio frequency circuitry and heating elements in accordance with an exemplary embodiment of the invention.

FIG. 5 illustrates a wirelessly powered flexible tag 54 employing a patterned coupling layer 56 having recess 58 to accommodate radio frequency circuitry 60 and the heating elements 62. Unlike the recess 58 of FIG. 4, the recess 58 does not extend to a surface 64 of the coupling layer 56, which is configured to be in contact with a substrate. However, the recess 50 extends up to the backing layer 66 that is coupled to the patterned coupling layer 56. The uninterrupted adhesion surface 64 enables high coupling strength between the substrate and the wirelessly powered flexible tag 54.

Figure 6:
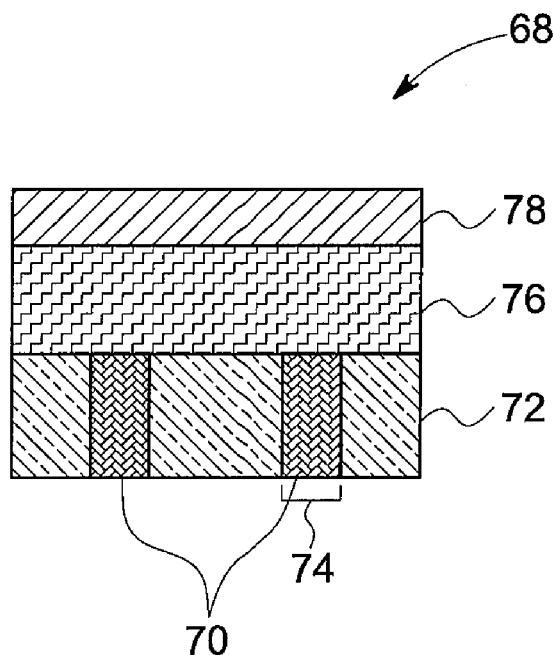
FIG. 6 is a cross-sectional view of a wirelessly powered flexible tag having a patterned coupling layer employing patterned electrodes in accordance with an exemplary embodiment of the invention.

FIG. 6 illustrates a wirelessly powered flexible tag 68 employing heating elements and/or electrodes 70 which may be in direct contact with a substrate. Accordingly, similar to the embodiment illustrated in FIG. 4, this embodiment supports the use of electrodes. It should be noted that although the illustrated design is configured to support the use of both heating elements and electrodes, for simplicity it is described with respect to electrodes. The wirelessly powered flexible tag 68 further includes a patterned coupling layer 72 having recess 74 to house the electrodes 70. The electrodes 70 and the surface of the coupling layer 72 to be coupled to the substrate are substantially coplanar. The recess 74 extends up to the radio frequency circuitry 76 so that the electrodes 70 are in electrical communication with the radio frequency circuitry 76. The radio frequency circuitry 76 may be either in direct contact with the electrodes 70, as illustrated, or the radio frequency circuitry 76 may be disposed between the sub-layers of the backing layer 78 and may not be in direct contact with the electrodes 70. In this embodiment, vias (not shown) may be formed in the sub-layers of the backing layer 78, such that the vias run between the electrodes 70 and the radio frequency circuitry 76 through the coupling layer 72 and the sub-layers of the backing layer 78 to provide electrical communication between the radio frequency circuitry 76 and the electrodes 70.

Figure 7:
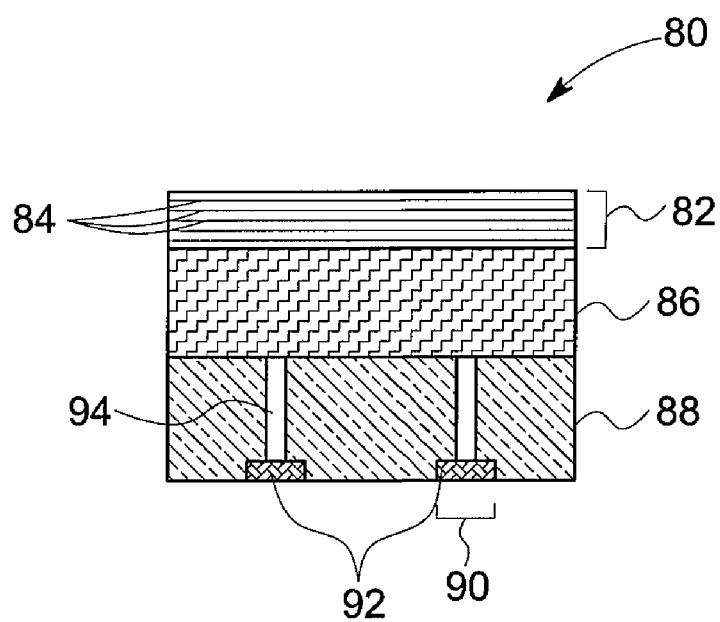
FIG. 7 is a cross-sectional view of a wirelessly powered flexible tag having electrodes in electrical communication with the radio frequency circuitry by using via in accordance with an exemplary embodiment of the invention.

FIG. 7 illustrates an embodiment suitable for employing electrodes, although heating elements may also be employed in the illustrated embodiment. The wirelessly powered flexible tag 80 employs a backing layer 82. The backing layer 82 may have a plurality of sub-layers 84. The backing layer 82 is coupled to radio frequency circuitry 86. The radio frequency circuitry 86 in turn is coupled to a patterned coupling layer 88. The patterned coupling layer 88 includes recess 90 to employ electrodes 92. The electrodes 92 are electrically coupled to the radio frequency circuitry 86 by means of vias 94. The vias 94 may be formed by drilling through holes in the coupling layer 88 and subsequently filling these holes with electrically conductive material, such as silver, copper, or electrically conductive polymers.

Figure 8:
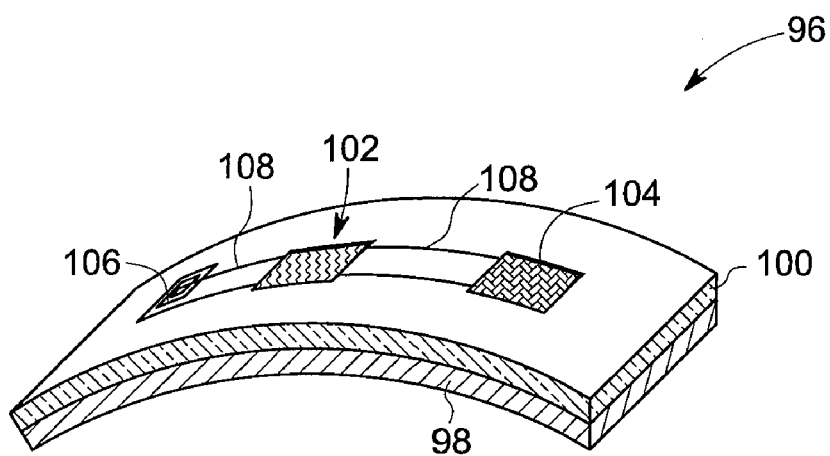
FIG. 8 is a perspective view of a flexed wirelessly powered flexible tag in accordance with an exemplary embodiment of the invention.

With reference to FIG. 8, a flexed wirelessly powered flexible tag 96 having a curved profile is illustrated. The tag 96 includes an optional flexible backing layer 98 coupled to a flexible coupling layer 100. The wirelessly powered flexible tag 96 is shown in an upside down configuration with regard to other wirelessly powered flexible tags discussed thus far. The coupling layer 100 is patterned to dispose electrical circuitry 102 and heating element 104. The radio frequency antenna 106 receives external stimuli, such as radio frequency waves and converts them to electrical energy via the electrical circuitry 102. The electrical energy is then transferred to the heating element via the electrical leads 108.

Figure 9:
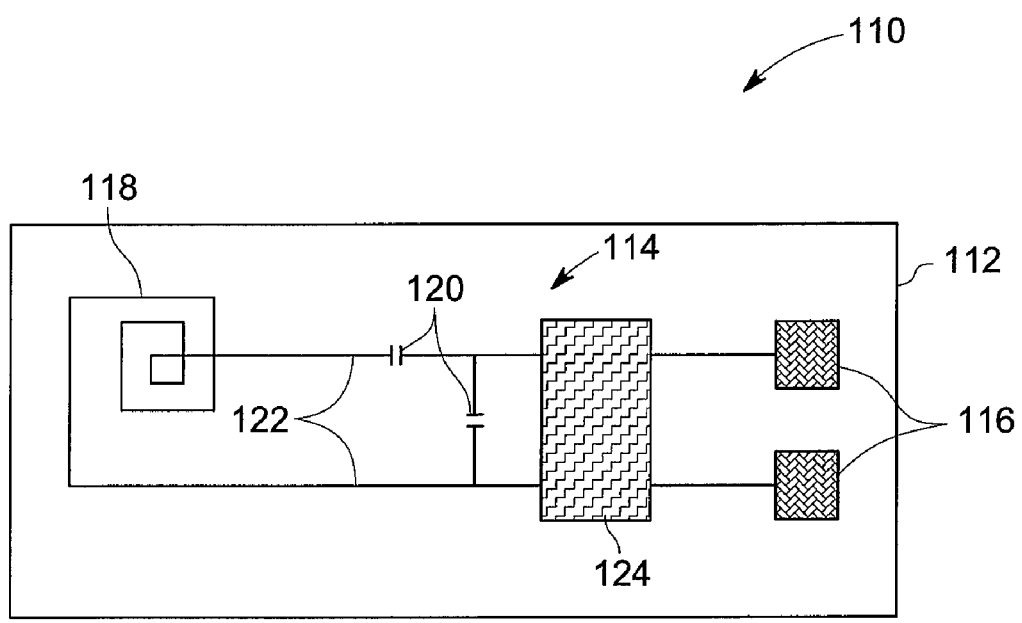
FIG. 9 is a top view of a wirelessly powered flexible tag employing electrical circuitry in accordance with an exemplary embodiment of the invention.

With reference to FIG. 9 a wirelessly powered flexible tag 110 having a backing layer 112 is illustrated. The backing layer 112 includes electrical circuitry 114 and heating elements and/or electrodes 116. The electrical circuitry 114 includes radio frequency circuitry having radio frequency antenna 118. Further, the radio frequency circuitry includes capacitors 120 electrically coupled to the antenna 118 by electrical leads 122. The electrical leads 122 may include a conductive material, such as silver or copper. Further, a block 124 is representative of additional electrical components, such as a transistor, a diode, a rectifier, an electrical receiver, a photocell, a rectifier, and a resistor, that may form a part of the electrical circuitry 114. Further, the electrical circuitry 114 may be in operative association with the heating elements and/or electrodes 116.

Figure 10:
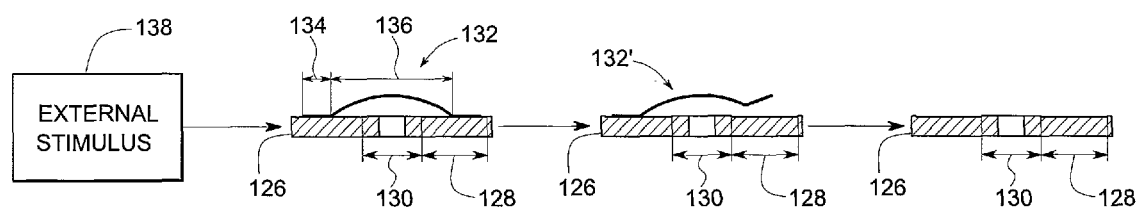
FIG. 10 is a diagrammatical representation of a method for changing a functionality of an optical article in accordance with an exemplary embodiment of the invention.

With reference to FIG. 10, a method of changing a functionality of an optical article such as an optical storage medium 126 from completely or partially unreadable to readable is illustrated. Although the illustrated method is with regard to optical storage medium 126, it should be appreciated that this method may be employed to change the functionality of other optical articles, such as an ID card, a payment card, a personal information card, flash memory card, etc., during authorization. The optical storage medium 126 includes a data storage region 128 and a non-data storage region or inner hub 130. The data storage region 128 includes an optical data layer (not shown), which stores the data, whereas the inner hub 130 is the non-data storage region of the optical storage medium 126.

The optical storage medium 126 further includes a wirelessly powered flexible tag 132 disposed across the hub region 130. Alternatively, the wirelessly powered flexible tag 132 may be disposed in different locations in the data storage region 128 surrounding the inner hub 130. The portions 134 of the wirelessly powered flexible tag 132 having the coupling layer are coupled to the medium 126, whereas the central portion 136 of the wirelessly powered flexible tag 132 is disposed above the hub region 130 and may not necessarily be in direct contact with the medium 126. In an exemplary embodiment, the central portion 136 may include an antenna (not shown) for the radio frequency circuitry. The antenna interacts with the RF energy and transfers the energy to the radio frequency circuitry. The wirelessly powered flexible tag 132 may include any of the wirelessly powered flexible tags 10, 16, 30, 40, 54, 68 or 80 of the previously depicted embodiments.

Further, the optical storage medium 126 may include one or more of the wirelessly powered flexible tag 132. The wirelessly powered flexible tag 132 may alter the state of functionality of the optical storage medium 126 as described above with regard to FIGS. 1-9. The method includes employing an external stimulus 138, such as a radio frequency radiation, to interact with the wirelessly powered flexible tag 132 to alter the locus of failure of the wirelessly powered flexible tag 132. During authorization, the RF circuitry of the wirelessly powered flexible tag 132 produces thermal energy by interacting with the RF radiation. This thermal energy then reacts with the coupling layer (not shown) of the wirelessly powered flexible tag 132 to facilitate removal of the wirelessly powered flexible tag 132 from the optical storage medium 126, thereby providing a readable optical storage medium 126.

Example 1

A wirelessly powered flexible tag (WPFT) was prepared as follows. Antenna Fabrication: a Tag-It® HF-1 RFID tag (Texas Instruments Inc., Dallas, Tex.) was modified by mechanically removing the integrated circuit and replacing it with an HSMS-2828 Schottky bridge diode (Agilent Technologies, Palo Alto, Calif.) to form a 13.875 MHz tuned rectenna. Coupling Layer: a thin layer of pressure-sensitive adhesive, 3M Blue 72 spray adhesive obtained from 3M Engineered Adhesives Division (St Paul, Minn.), was applied to the backside of the WPFT substrate. The tag was then coupled to the polycarbonate surface of a DVD by use of the 3M adhesive. Electrode: the DC output from the diode bridge was then connected by a pair of wires to an electrochromic material or light-emitting diode. Device Characterization: an HP 3577A Network Analyzer was configured to transmit a 13.875 MHz signal with the aid of a 2 cm loop wire antenna. The transmitter was tuned to 13.875 MHz. The output voltage from the rectenna was 3.3 VDC when the device was 1 cm from the transmission antenna.

Example 2

The DC leads from the WPFT described in Example 1 were attached to a strip of an electrochromic device (ECD) completing the electric circuit. The ECD device consists of two layers of Orgacon EL350 (a 175 mm polyethylene terephthalate base film coated with a polyethylene dioxythiophene polystyrenesulfonate (PEDOT-PSS) (350 ohm/cm) obtained from Agfa-Gevaert NV, SFC Division, Septestraat (27 B-2640 Mortsel, Belgium) separated by a thin film of 45% in water of polyacrylic acid sodium salt (PAANa) (Aldrich, Milwaukee, Wis., USA) as electrolyte. The ECD was transparent in the absence of RF energy, and darkened to blue upon exposure to a 13.875 MHz RF signal. The percent reflectivity before and after activation of the WPFT was measured by use of an Ocean Optics USB2000 fiber optic spectrometer. The optical reflectivity at 650 nm significantly changed from 72% at 0 VDC to only 35% after 3 VDC activation for a few seconds. Since the ECD is visibly activated with as little as 3 VDC, the WPFT was deemed suitable to power the device. It was also demonstrated that the WPFT powered several optoelectronic devices including a surface mount light-emitting diode and a flexible organic light-emitting diode (OLED) film.

Example 3

Wireless energy was transferred from a fixed transmitting device to a WPFT by inductive coupling at 14.01 MHz between two coils arranged near one another about 0.5 inches apart. The two coils act as a resonant air-core radio frequency transformer. For laboratory test purposes, a receiving coil was attached to the center of a commercially authored optical article around the hub area where there is no metallization. The optical article was affixed to a piece of foam spacing material about 0.5 inches thick to provide support for a transmitter coil at a fixed distance from the optical article. The transmitter coil was affixed to the backside of the foam spacing material to maintain constant spacing between the two coils. To efficiently transfer a significant amount of power to the WPFT model, both the primary and the secondary coils of the air-core RF transformer were matched with two capacitors chosen to cancel the transformer reactance and to match the resistance to approximately 50 ohms for the convenience of measurement. Many matching circuits could be used for this purpose, but a tapped capacitor was selected as requiring the least space in final implementation. Additional inductors often used in matching circuits were specifically avoided to minimize space. The inherent inductance of the transformer coils was used for the inductors required in the matching network. To date, lab scale tests demonstrated that the air core RF transformer could readily transmit more than 15 watts to the WPFT load(s) attached to the receiver coil on the optical article. The air-core RF transformer described above was used in combination with several custom-made thin film heating elements made of tantalum nitride (TaN), deposited on a flexible substrate made of a polyimide film (Kapton®). The resistive element included tantalum nitride with a surface resistivity of 19 ohms/square, and was patterned as 2 mm×4 mm rectangle by photolithography. The thickness of the TaN was 100 nm, and on either side of the TaN rectangle was patterned Cu pads that were 4.3 microns thick. The complete resistive heating element, together with copper contacts, had a resistivity of about 58 ohms. In lab tests, several different RF power levels from the test air core RF transformer were directly applied to several of these TaN heating elements. The WPFT was connected via copper foil to the heating element, which was coupled to a glass slide with Kapton adhesive tape. A thermocouple was placed on top of the heater and connected to a Mastech MS345 digital multimeter (Precision Mastech Enterprises Co., Hong Kong). RF energy of frequency 14.01 MHz was applied to the WPFT at varying powers and the temperature of the heating element was recorded. A very rapid rise and fall in temperature was observed with the application and removal of RF AC current. For a 2 mm×4 mm TaN heating element an applied RF power of 0.25 W resulted in a surface temperature of about 58° C. within about 5 seconds; with an applied RF power of 0.5 W resulted in a surface temperature of about 90° C. within about 5 seconds.

Example 4

The air-core RF transformer described in Example 3 was used in combination with standard, commercially available, chip resistors as the resistive heating elements. Two small 0.25 watts resistors were connected in parallel making a larger resistor rated at 0.5 watt covering an area about 130× 130 mils. Lab tests confirmed that a heating element made from these two simple, inexpensive, components could be used to purposely heat a substrate with power provided in a wireless fashion as describe in Example 3. An applied RF power of 1.0 W resulted in a surface temperature of about 100° C. within about 5 seconds; with an applied RF power of 2.0 W resulted in a surface temperature of about 160° C. within about 40 seconds.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include some of the described embodiments. Accordingly, the invention is not to be seen as limited by the foregoing description, but is only limited by the scope of the appended claims.

What is claimed as new and desired to be protected by Letters Patent of the United States is:

1. A wirelessly powered flexible tag configured to be in contact with a substrate, comprising:
   a coupling layer configured to couple said tag to said substrate;
   an electrical circuit disposed on said coupling layer and configured to interact wirelessly with an external stimulus;
   at least one electrode in operative association with said electrical circuit, wherein the electrode is disposed in the coupling layer, and configured to generate electrical energy or thermal energy, respectively, wherein the electrode and a surface of the coupling layer to be coupled to the substrate are substantially coplanar, and
   at least one recess formed in the coupling layer, wherein the at least one electrode is disposed in the recess;
   wherein upon wireless interaction with the external stimulus said tag is configured to induce an electrical response, a thermal response, or a combination of both in said substrate.

2. The wirelessly powered flexible tag of claim 1, wherein said coupling layer is coupled to said substrate via an electrostatic attraction mechanism, a chemical mechanism, an electrochemical mechanism, a thermal mechanism, a physical mechanism, a cross linking mechanism, an adhesive mechanism or any combination thereof.

3. The wirelessly powered flexible tag of claim 2, wherein said tag is removably coupled to said substrate.

4. The wirelessly powered flexible tag of claim 2, wherein said coupling layer is irremovably coupled to said substrate.

5. The wirelessly powered flexible tag of claim 2, wherein said coupling layer comprises an adhesive component.

6. The wirelessly powered flexible tag of claim 5, wherein said adhesive component comprises a pressure-sensitive adhesive, a water soluble adhesive, an acrylate-based adhesive, a silicone-based adhesive, an elastomer-based adhesive, an epoxy-based adhesive, a thermoset adhesive, or any combination thereof.

7. The wirelessly powered flexible tag of claim 1, wherein said coupling layer comprises a plurality of sub-layers.

8. The wirelessly powered flexible tag of claim 1, wherein said coupling layer comprises a patterned surface.

9. The wirelessly powered flexible tag of claim 1, wherein said electrical circuit comprises radio frequency circuitry.

10. The wirelessly powered flexible tag of claim 9, wherein said electrical circuitry further comprises a thermocouple, a light-emitting diode, a strain gauge, a sound producing element, an acoustic sensor, a diode, an antenna, a dipole, an electrical receiver, a photocell, a resistor, a capacitor, a rectifier, an integrated circuit, a surface mount resistor, a chip resistor, an electrode, a heating element, or any combination thereof.

11. The wirelessly powered flexible tag of claim 10, wherein the electrical circuitry is configured to produce at least one output selected from the group consisting of a DC electrical output, an AC electrical output, a DC pulsed electrical output, or an AC pulsed electrical output.

12. The wirelessly powered flexible tag of claim 1, wherein the electrode is made from a material comprising a conjugated polymer, carbon, silver, copper, gold, aluminum, platinum, lead dioxide, stainless steel, indium tin oxide or any combinations or alloys thereof.

13. The wirelessly powered flexible tag of claim 1, further comprising a backing layer.

14. The wirelessly powered flexible tag of claim 13, wherein said backing layer comprises a flexible plastic material, a flexible thin metal foil material, or a combination thereof.

15. The wirelessly powered flexible tag of claim 13, wherein the backing material comprises polycarbonates, polyethylenes, polypropylenes, polyesters, polyimides, polysulfones, polyethylene terapthalates, polyamides, polyacrylates, polyurethanes, polyesters, synthetic rubbers, styrene-butadiene random and block copolymers, natural rubbers, isoprene, silicone materials, cross linked silicone materials, EPDM materials, and any copolymers or combinations thereof.

16. The wirelessly powered flexible tag of claim 13, wherein said backing layer comprises a plurality of sub-layers.

17. The wirelessly powered flexible tag of claim 13, wherein said electrical circuit is disposed on said backing layer.

18. The wirelessly powered flexible tag of claim 16, wherein said electrical circuit is disposed on one of the said sub-layers.

19. The wirelessly powered flexible tag of claim 13, wherein said electrical circuit is disposed between said coupling layer and said backing layer.

20. The wirelessly powered flexible tag of claim 1, wherein said substrate comprises a plastic substrate, a metal substrate, a glass substrate, a wood substrate, a paper substrate, a coated substrate, a mineral substrate, a ceramic substrate, a thermochromic material, electrochromic material, a photochromic material or any combinations thereof.

21. The tag of claim 1, wherein said external stimulus comprises a laser energy, a thermal energy, infrared rays, X-rays, gamma rays, microwaves, visible light, ultraviolet light, ultrasound waves, radio frequency waves, electrical energy, chemical energy, magnetic energy, mechanical energy, or combinations thereof.

22. A wirelessly powered flexible tag configured to be in contact with a substrate, comprising:
   a patterned coupling layer configured to couple said tag to said substrate;

radio frequency circuitry disposed on said coupling layer and configured to interact wirelessly with an external stimulus; and at least one electrode or at least one heating element in operative association with said radio frequency circuitry, and configured to generate electrical energy or thermal energy, respectively, wherein the electrode or the heating element and a surface of the coupling layer to be coupled to the substrate are substantially coplanar;

at least one recess formed in the coupling layer, wherein the at least one electrode or at least one heating element are disposed in the recess; and a backing layer coupled to said radio frequency circuitry or said patterned coupling layer;

wherein upon wireless interaction with said external stimulus said tag is configured to induce an electrical response, a thermal response, or a combination of both in said substrate.

23. The wirelessly powered flexible tag of claim 22, wherein the heating element is made from a material comprising titanium, copper, nickel, gold, tantalumnitride, aluminum, molybdenum, titanium-tungsten, chrome, platinum, nichrome, indium tin oxide and any combinations or alloys thereof.

24. The wirelessly powered flexible tag of claim 22, further comprising an RFID tag.

25. The wirelessly powered flexible tag of claim 22, further comprising a logic chip that renders the tag active upon external authentication.

26. A method for using a wirelessly powered flexible tag, comprising:
  coupling the tag to a substrate, the tag comprising:
    a coupling layer configured to couple the tag to the substrate;
    an electrical circuit disposed on the coupling layer and configured to interact wirelessly with an external stimulus; and
    at least one electrode or a at least one heating element in operative association with the electrical circuit, and configured to generate electrical energy or thermal energy, respectively; wherein the at least one electrode or at least one heating element are disposed in at least one recess formed in the coupling layer
  interacting the tag with the external stimulus to induce an electrical response, a thermal response, or a combination of both in the substrate.

27. The method of claim 26, wherein an antenna of the tag is configured to interact with a reader disposed outside the tag, and wherein the interaction between the antenna and the reader facilitates interaction of the tag with the external stimulus.

28. The method of claim 26, wherein the substrate comprises an antitheft feature, and wherein the anti-theft feature is configured to alter from a pre-activated state to an activated state upon interaction with the electrical or thermal energy to change the functionality of the substrate.

* * * * *